United States Patent [19]

Isoi et al.

[11] Patent Number: 4,833,047

[45] Date of Patent: May 23, 1989

[54] ELECTROLYTE FEEDER FOR BATTERY

[75] Inventors: Toshihiro Isoi; Masakazu Sato, both of Takatsuki; Shuji Takahashi, Wako, all of Japan

[73] Assignees: Yuasa Battery Co., Ltd., Takatsuki; Honda Giken Kogyo Kabushiki Kaisa, Tokyo, both of Japan

[21] Appl. No.: 112,304

[22] Filed: Oct. 26, 1987

[30] Foreign Application Priority Data

Oct. 27, 1986 [JP] Japan ............... 61-164552[U]

[51] Int. Cl.$^4$ ............................................. H01M 2/36
[52] U.S. Cl. .......................................... 429/72; 429/80
[58] Field of Search .................... 429/80, 63, 72, 74, 429/64

[56] References Cited

U.S. PATENT DOCUMENTS

| | | | |
|---|---|---|---|
| 2,299,545 | 10/1942 | Jardine | 429/63 |
| 2,471,094 | 5/1949 | Christen | 429/74 X |
| 2,500,169 | 3/1950 | Ellis | 429/74 X |
| 2,881,239 | 4/1959 | Fingerhut | 429/72 |
| 3,740,272 | 6/1973 | Blaich et al. | 429/63 |
| 4,565,750 | 1/1986 | Isoi et al. | 429/80 X |

FOREIGN PATENT DOCUMENTS 62-84163 11/1987 Japan .

Primary Examiner—Anthony Skapars
Attorney, Agent, or Firm—Armstrong, Nikaido, Marmelstein, Kubovcik & Murray

[57] ABSTRACT

An electrolyte feeder for battery including an electrolyte container, said container comprising a shell body filled with an electrolyte in a plurality of spaced cell units, equal in number to the number of individual cells in a dry changed storage battery, each of said shell bodies having a filling tube, said filling tubes being spaced to coincide with the spacing between filling ports of said battery to enable the filling tubes to fit into the corresponding one of the filling ports, a thin film being formed at a tip end of the filling tube, and said thin film sealing up each shell body.

15 Claims, 6 Drawing Sheets

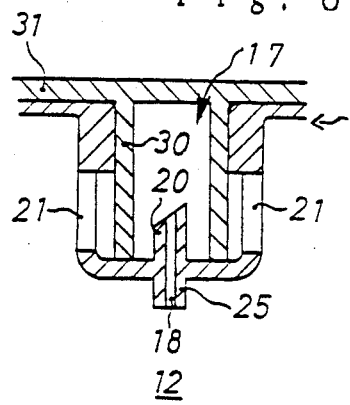
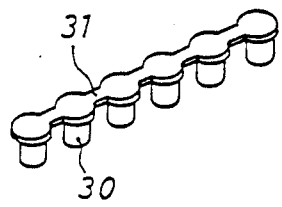
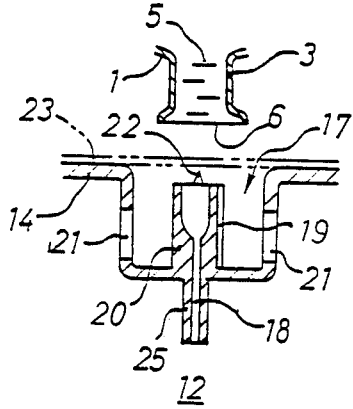
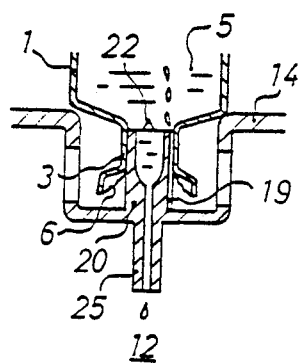
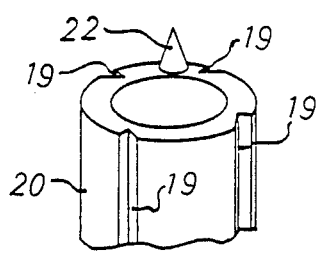
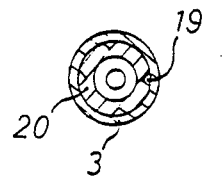

ELECTROLYTE FEEDER FOR BATTERY

BACKGROUND OF THE INVENTION 1. (Industrial Useful Field)

This invention relates to an electrolyte feeder for battery in order to fill an electrolyte into a battery composed of plural cells.

2. (Prior Art)

As a means for filling an electrolyte of a prescribed amount into each cell of a dry-charged lead acid battery having dry charged positive and negative plates and filled with no electrolyte, which requires filling of the electrolyte only once for the first time and no further filling of it thereafter; a monoblock type electrolyte container filled collectively with an electrolyte of an amount for one battery (for all cells) in one container has been used. (Japan Utility Model Publication KOKAI No. 35-8021).

In using such an electrolyte container, however, it is necessary to successively fill electrolyte into each cell through visual measurement. Accordingly, there are the disadvantages that excess in filling some cells and deficiency in filling others will occur and additional work for readjusting the above excess or deficiency becomes necessary. To adjust the electrolyte level in the cells, requires manpower and considerable time to transfer the electrolyte from one cell to another. Further, the electrolyte is easily spilled.

In order to overcome the above disadvantages, an electrolyte container has conventionally been proposed, wherein shell bodies 2' having filling tube 3' at their end portions are interconnected in the same quantity as that of cell to fill the electrolyte 5' of the cell unit in each shell body 2' as shown by FIG. 2 (Japan Patent Publication KOKAI No. 60-74343). In using such an electrolyte container, however, it is necessary to cut a tip end of container with a nipper or scissors. Further, cut-away pieces will be scattered around when cut by the nipper or scissors, and moreover electrolyte 5' remaining in the cut-away pieces will also be spilled here and there accompanied by the scattering of the pieces.

3. (Object of the Invention)

An object of the invention is to provide an electrolyte feeder which enables filling of a correct amount of electrolyte into a battery with a little manpower and within a short time and further enables sure filling thereof without using a nipper or scissors.

SUMMARY OF THE INVENTION

In this invention as set forth by claims 1~6 in order to accomplish the above object; an electrolyte feeder for battery is provided, in which shell bodies filled with electrolyte of cell units of battery are connected in the same quantity of the cell to form an electrolyte container. A filling tube is provided on each shell body. Each filling tube is aligned with each filling port of the battery so that the filling tubes can fit in the filling ports; A thin film is formed at a tip end of the filling tube. Each shell body is sealed with the thin film, and each shell body can be opened by breaking the thin film.

In the invention of claim 2, in order to avoid breakage of the thin film due to shock etc. during transportation of the container, an electrolyte feeder for a battery as set forth in claim 1 is further improved so that a sealing plug for battery can be utilized also as a protective plug for container.

In the invention of claim 3, in order to allow the electrolyte to be filled securely without being leaked or clogged, an electrolyte feeder for battery as set forth in claim 1 is further improved so that an upwardly projecting filling sleeve fitting freely in an inner periphery of filling tube of electrolyte container and being able to open the filling tube is formed at a filling port of battery, and an air groove for supplying air to the electrolyte container is formed on an outer peripheral surface of said sleeve.

In the invention of claim 4, in order to allow the electrolyte to be filled securely without being leaked or clogged, an electrolyte feeder for battery as set forth in claim 1 is further improved so that an upwardly projecting filling sleeve is formed fitting freely in an inner periphery of filling tube of electrolyte container and being able to open said filling tube is formed on an at a filling port of battery, and an air groove for supplying air to the electrolyte container is formed inner peripheral surface of the filling tube.

In the invention of claim 5, in order to improve a durability and corrosion resistance of the thin film, an electrolyte feeder for battery as set forth in claim 1 is further improved so that thermal resisting polyester resin layers are formed on both sides of an aluminum sheet serving as a thin film body, and a polyethylene resin layer for thermocompression bonding having the same material as the container is formed at a most-inside surface of the container.

In the invention of claim 6, in order to enhance the opening ability for the thin film and to surely prevent clogging etc. of the air groove at time of filling electrolyte, an electrolyte feeder for battery as set forth in claim 3 is further improved so that a notched portion is formed at a tip end of sleeve, an air groove is formed at a position deviated in a circumferential direction from the tip end, and a radially outwardly extending rib is formed on a sleeve outer peripheral surface corresponding to a bottom side part of the air groove.

BRIEF DESCRIPTION OF THE INVENTION

FIG. 8 is an enlarged sectional view of a filling port showing a state where the sealing plug of FIG. 7 is fitted in a filling port of battery.

FIG. 9 is an oblique view of the entire sealing plug of battery.

FIG. 10 is an enlarged sectional view of the filling tube showing a state immediately before connecting the electrolyte container according to claim 3 to the battery.

FIG. 11 is an enlarged sectional view of the filling tube correspoonding to FIG. 10 showing a state where the filling tube is connected to the battery.

FIG. 12 is an enlarged oblique view of a filling sleeve corresponding to FIG. 10.

FIG. 13 is a horizontal sectional view of the filling sleeve corresponding to FIG. 11.

DETAILED DESCRIPTION OF THE INVENTION

(Embodiment 1)

Figure 1:
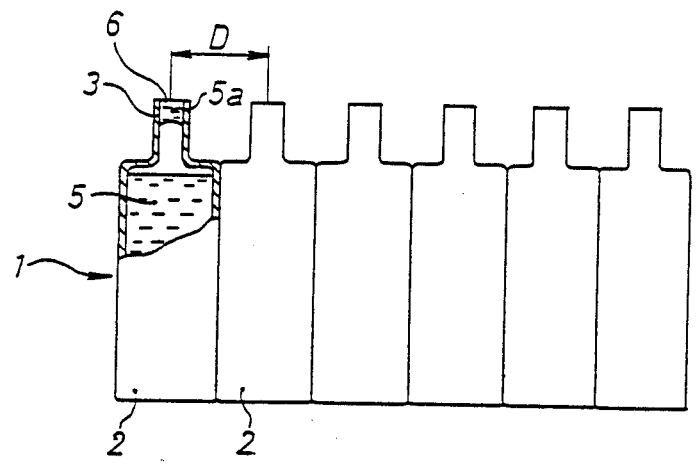
FIG. 1 is a partially fragmental front view of the electrolyte container for battery according to claim 1.

In FIG. 1 showing the electrolyte feeder according to claim 1, a polyethylene (polyolefin) resin electrolyte container 1 comprises an approximately parallelepiped six fold shell body 2. The shell bodies 2 are interconnected in one row, and a cylindrical filling tube 3 is integrally formed on a tip end portion (upper end portion of FIG. 1) of each shell body 2. An inside of the shell body 2 is hollowed to be isolated into each shell body 2, and an electrolyte 5 of each of cell units of a dry-charged lead acid battery (described later in details) is stored in the shell body 2. At first the electrolyte 5 is sealed in the shell body 2, however, sometimes a part 5a of the electrolyte 5 is apt to enter a filling tube 3 due to vibration etc. during transportation and to be held as it is in the filling tube 3 through means of a surface tension.

A thin film (thermo tape seal) 6 is provided at a tip end of each filling tube 3, and an upper end of the filling tube 3 is sealed by the thin film 6. The thin film 6 comprises an aluminum sheet layer and a polyethylene (polyolefin) resin layer, and the polyethylene resin layer is bonded by thermocompression to the filling tube 3 of the container 1.

Figure 4:
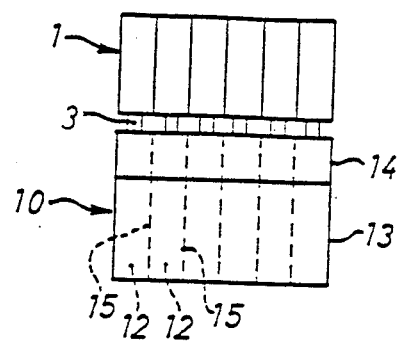
FIG. 4 is a front view of an electrolyte container showing a working state of filling electrolyte.

In FIG. 4 showing an example of the dry-charged lead acid battery applied with the electrolyte container 1, the dry-charged lead acid battery 10 is provided with a container 13 an an upper container cover 14. An inside of the container 13 is divided into six cell chambers 12 for example by partition walls 15, and an assembled element (positive and negative plates, separator etc.) is inserted into each cell chamber 12.

Figure 2:
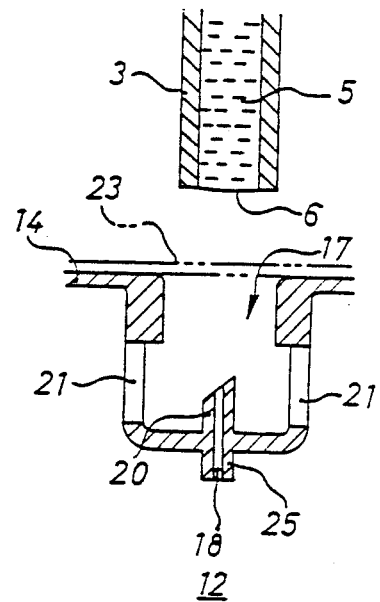
FIG. 2 is an enlarged sectional view of a filling tube showing a state immediately before connecting the filling tube to a battery.

A recessed filling port 17 is formed intergrally with the container cover 14 at a portion of cover 14 corresponding to each cell chamber 12 as illustrated by FIG. 2, and a filling hole 18 interconnecting to the lower cell chamber 12 is formed at a bottom portion of the filling port 17. An upwardly extending cylindrical filling sleeve (projecting portion) 20 is formed intergrally with the cover 14 around the filling hole 18, and an upper edge of the filling sleeve 20 is cut diagonally to provide a sharp edge. Further, an air hole 21 is formed on a side wall of the filling port 17, and the air hole 21 interconnects the cell chamber 12 with the filling port 17. A cylindrical projection 25 is formed also around and below the filling hole 18, and a flow rate (flow velocity) is restricted by a passage size in the projection 25.

Moreover, an aluminum foil 23 on a cover 14 side of which is coated with resin, is secured to an upper surface of the cover before filling the electrolyte. The aluminum foil 23 seals the filling port 17, thereby preventing the charged positive and negative plates in the cell chamber 12 from being exposed to the atmosphere. A distance D between neighboring filling tubes 3 of foregoing FIG. 1 is the same with a distance between neighboring filling ports 17 of FIG. 2 so that all the filling tubes 3 of FIG. 1 can be fitted simultaneously in the filling ports 17 of FIG. 2.

A method of filling electrolyte will be described hereunder.

In order to commence use of the dry-charged lead acid battery, it is necessary to fill the electrolyte in the battery and the electrolyte container 1 of FIG. 1 is to be used. The aluminum foil 23 of FIG. 2 is first peeled off from the cover 14 to expose the filling port 17.

Figure 3:
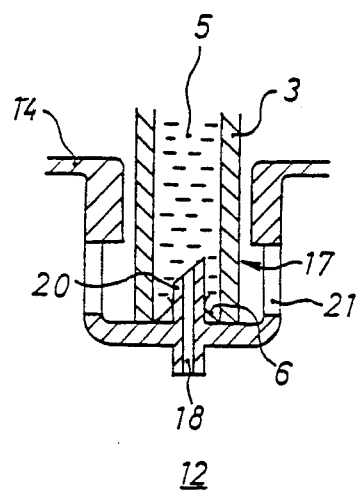
FIG. 3 is an enlarged sectional view of the filling tube showing a state where the filling tube is connected to the battery.

The electrolyte container 1 is next turned upside down to fit and depress each filling tube 3 into each filling port 17, thus the thin film 6 is broken by the filling sleeve 20 and the filling tube 3 is fitted onto the filling sleeve 20 as illustrated by FIG. 3.

When an air hole is made by a pin etc. on a bottom part of the shell body 2 of the electrolyte container 1 under a state as shown by FIG. 4, the electrolyte 5 will be filled in each cell chamber 12 at a prescribed filling velocity. Air in the cell chamber 12 is vented from the hole 21 of FIG. 2.

After completion of filling electrolyte, the container 1 is removed from the filling port 17, a sealing plug (not shown) is fitted in the filling port 17 and the filling hole 18 is sealed. Plug bodies may be used as the sealing plug, having for example a number corresponding to that (six in this case) of the filling port 17 and connected integrally through flexible portions.

The upwardly extending filling sleeve 20 is formed on each filling port 17 of the battery as illustrated by FIG. 2, so that the thin film 6 can be broken and opened by means of the filling sleeve 20 by only depressing the filling tube 3, and at the same time the filling tube 3 can be connected to the filling port 17. Thereby, the filling work can be commenced just from this state so that the construction provides a practical serviceability.

(Embodiment 2)

Figure 5:
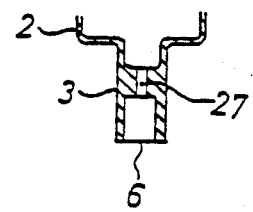
FIG. 5 is an enlarged sectional view showing an alternate construction of the filling tube.

FIG. 5 is an example wherein a flow restriction passage 27 having a small flow passage area is formed in the filling tube 3. Too large filling velocity would cause an overflow of electrolyte from the battery and/or a failure to obtain a specified battery performance, so that a preferable filling velocity is around 0.5~2.0 cc/sec.

(Embodiment 3)

FIG. 6~FIG. 9 show the electrolyte feeder according to claim 2. Construction of electrolyte container 1 is the same as that of FIG. 1 and components same with those of FIG. 1 are attached with the same symbols.

A bottomed cylindrical battery sealing plug 30 is fitted onto an outer periphery of each filling tube 3. The sealing plugs 30 are integrally interconnected by a flexible connecting portion 31 as illustrated by FIG. 9.

A battery having the same construction as foregoing FIGS. 2~4 is used, and in FIG. 8 the same components with those of FIG. 2 are attached with the same symbols.

Figure 7:
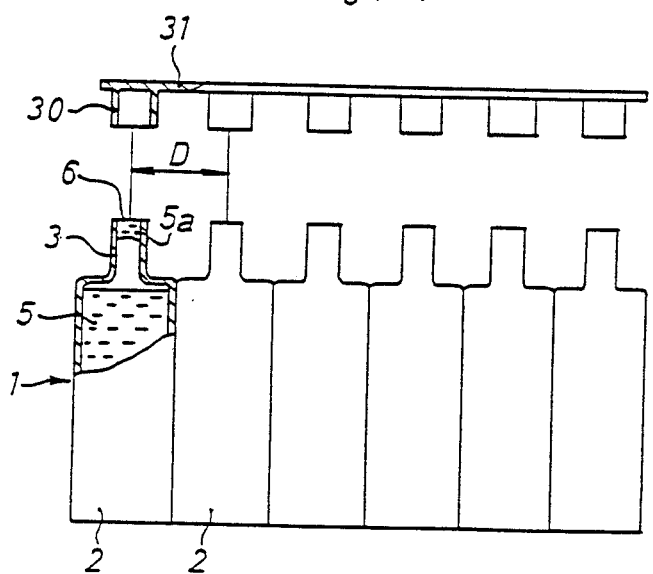
FIG. 7 is a front view of the electrolyte container corresponding to FIG. 6 showing a state where a sealing plug is removed.
Figure 15:
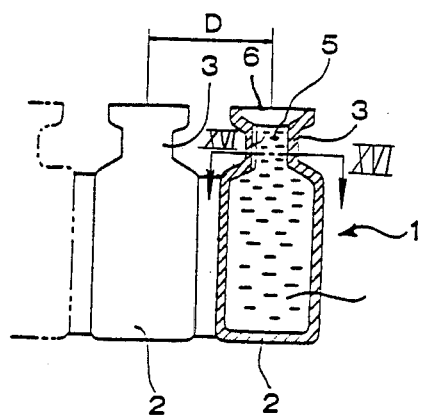
FIG. 15 is a vertical sectional view of the electrolyte container according to claim 4.
Figure 14:
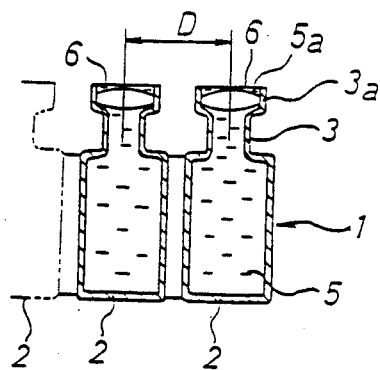
FIG. 14 is a vertical sectional view of the electrolyte container corresponding to FIG. 10.

In FIG. 7, a distance D between neighboring sealing plugs 30 corresponds to a distance between the neighboring filling ports 17 of FIG. 8. Therefore, each sealing plug 30 can fit onto each filling port 17 of FIG. 8.

A method of filling electrolyte will be described hereunder.

Figure 6:
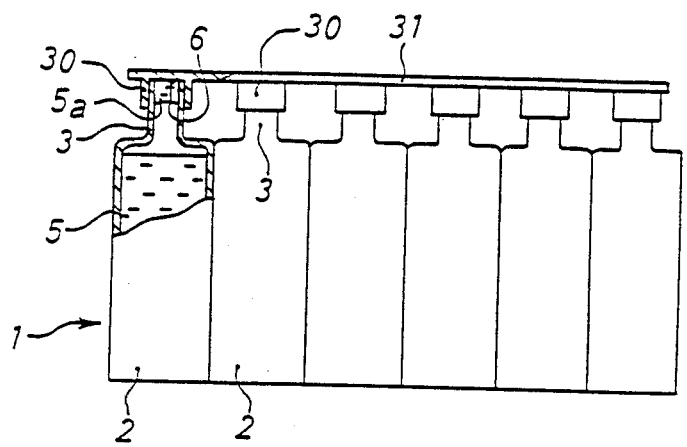
FIG. 6 is a partially fragmental front view of the electrolyte container for battery according to claim 2.

When the electrolyte container is stored or transported, the sealing plug 30 is fitted onto the filling tube 3 of the electrolyte container 1 to protect the thin film 6 from being broken due to shock etc. as illustrated in FIG. 6.

The sealing plug 30 should first be removed from the electrolyte container 1 when filling the electrolyte in the battery in order for commencing the use of dry-charged lead acid battery. A practical filling work is the same as that described in the foregoing FIG. 2 and FIG. 3.

After completion of the filling work, the container 1 is removed from the filling port 17, and the sealing plug 30 is fitted onto each filling port 17 to seal up the sealing hole 18.

(Embodiment 4)

FIG. 10~FIG. 14 show the electrolyte feeder according to claim 3. An outside diameter of the filling sleeve 20 is inscribed in an inside diameter of the filling tube 3 of the electrolyte container 1. However, there exists a differential diameter of about 0.2~0.5 mm, in practice. An inside diameter of the filling sleeve 20 is made small at its lower portion, for example, in order to adjust a flow-in velocity. Too large a velocity would cause an overflow of electrolyte from the battery and/or a failure to obtain a specified battery performance, so that a preferable filling velocity is around 0.5~2.0 cc/sec.

An upwardly protruding projection 22 is formed on an upper end surface of the filling sleeve 20 in order to give the thin film 6 of the electrolyte container 1 a chance to break. Four vertically extending air grooves 19 are formed on an outer peripheral surface of the filling sleeve 20 as illustrated by FIGS. 12 and 13, so that air can be sent in the electrolyte container 1 through the air grooves 19 when filling the electrolyte.

Other contructions of the electrolyte container and the battery are approximately similar to those of the foregoing Embodiment 1, the same components are attached with the same symbols. A tip end of the filling tube 3 has an enlarged diameter in order for serving as a filling sleeve lead-in portion 3a.

The method of filling electrolyte is similar to the foregoing Embodiment 1. The filling tube 3 fits nicely onto the filling sleeve 20 during filling the electrolyte as illustrated by FIG. 11. Further, the electrolyte 5 in the container 1 is replaced by air flowing from the air groove 19 into the container 1 and supplied to the cell chamber 12. Accordingly, the electrolyte can be supplied smoothly even when an air hole is not made at the bottom of the electrolyte container 1. Air in the cell chamber 12 is vented from the air hole 21.

The four air grooves 19 are formed in FIG. 13 etc., but one air groove 19 may be enough for this purpose.

(Embodiment 5)

Figure 16:
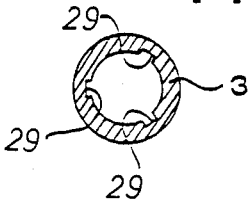
FIG. 16 is a sectional view taken on a line XVI—XVI of FIG. 15.
Figure 17:
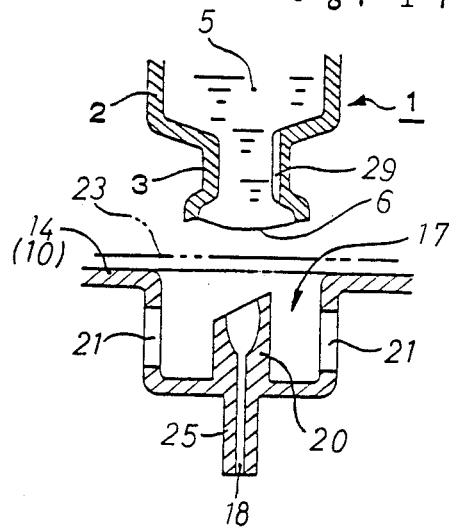
FIG. 17 is an enlarged vertical sectional view showing a state immediately before fitting the container of FIG. 15 into the filling sleeve of battery.

FIG. 15~FIG. 18 show the electrolyte feeder according to claim 4, in which the air groove 29 is formed on an inner peripheral surface of the filling tube 3 of the container 1. Three air grooves 29 are formed, for example, as illustrated by FIG. 16. An upper edge of the filling sleeve 20 of FIG. 17 is cut diagonally to form a sharp edge. An outside diameter of the filling sleeve 20 is inscribed in an inside diameter of the filling tube 3 of the electrolyte container 1. However, there exists a differential diameter of about 0.2~0.5 mm, in practice. Other constructions of the container and the battery are approximately similar to those of the foregoing Embodiment 1, and the same components are attached with the same symbols.

Figure 18:
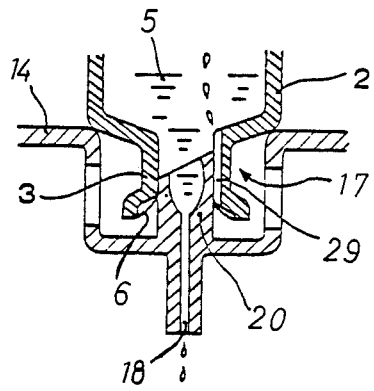
FIG. 18 is an enlarged vertical sectional view showing a state where the container of FIG. 15 is fitted in the filling sleeve of battery to fill the electrolyte therein.

Also in this construction, the method of filling electrolyte is the same as that of Embodiment 1. The filling tube 3 fits nicely onto the filling sleeve 20 during filling the electrolyte as illustrated by FIG. 18. Further, the electrolyte 5 in the container 1 is replaced by air flowing from the air groove 29 into the container 1 and supplied to the cell chamber 12. Accordingly, the electrolyte can be supplied smoothly even when an air hole is not made at the bottom of the electrolyte container 1.

The number of the air grooves 29 may be one or two.

(Embodiment 6)

Figure 19:
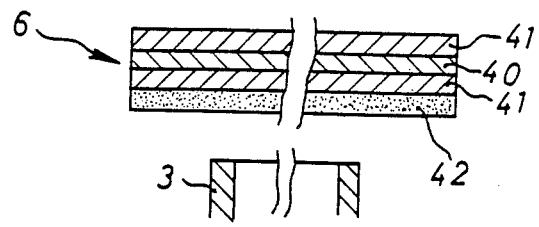
FIG. 19 is an enlarged vertical sectional view of the thin film according to claim 5.

FIG. 19 shows the enlarged vertical sectional view of the thin film 6 according to claim 5. In this figure, however, thicknesses are illustrated exaggerately to clearly show positional relation between layers. In this thin film 6, polyester resin layers 41 for example having a thermal resistance of above 220° C. are formed on both sides of the aluminum sheet body layer 40 and a polyethylene resin layer 42 having the same material as the container 1 is formed on a most-inside surface of the container 1. The melting point of the polyethlene resin layer 42 is around 140°~200° C.

When the thin film 6 is bonded by thermocompression to the filling tube 3 of the container 1, the thermocompression bonding is carried out within the melting range of polyethylene. Accordingly, even when the polyethylene resin layer 42 is perforated during the thermocompression bonding, the aluminum sheet body layer 40 is protected from external attacks by the polyester resin layer 41 so that the aluminum sheet body layer 40 has no problem of being perforated due to corrosion by dilute sulfuric acid electrolyte.

The thin film 6 having the construction of FIG. 19 is naturally installed in the same electrolyte container as the foregoing Embodiment 1.

(Embodiment 7)

Figure 20:
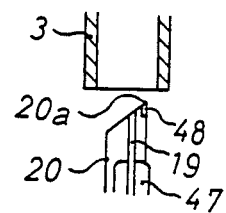
FIG. 20 is an enlarged front view of the filling sleeve of battery according to claim 6.
Figure 21:
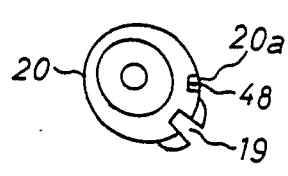
FIG. 21 is a top view of the filling sleeve of FIG. 20.
Figure 22:
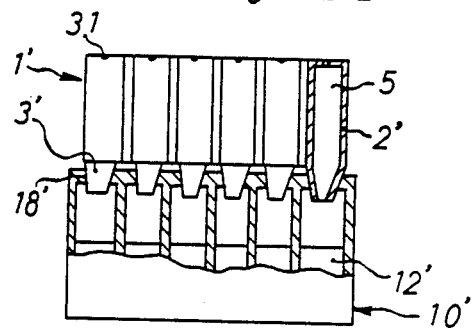
FIG. 22 is a vertical sectional view of conventional embodiment.

FIGS. 20 and 21 show the electrolyte feeder according to claim 6. The filling sleeve 20 in the battery is out diagonally at its upper edge, thereby having a sharp tip end 20a. A notched portion 48 is formed on the tip end 20a to break the thin film 6 easily.

The air groove 19 is formed on an outer peripheral surface of the filling sleeve 20 at a position deviated from the tip and 20a in a circumferential direction. Further, a radially outwardly circularly extending rib 47 is integrally formed on an outer peripheral surface of the filling sleeve 20 at a position corresponding to the bottom part of the air groove 19 as shown in FIG. 21.

Namely, the air groove 19 is made higher at a portion passing the rib 47.

The method of filling electrolyte is the same as that of the foregoing Embodiment 1. When the filling tube 3 is fitted onto the filling sleeve 20 Δ of the container 1, the thin film 6 can be broken easily by only pushing the container softly due to the notched portion 48 provided at the tip end 20a. Namely, a breaking strength can be minimized. Further, a broken fragment of the thin film 6 becomes round due to the notched portion 48 provided, so that the fragment becomes hard to enter the air groove 19.

Moreover, when the filling tube 3 is completely fitted onto the filling sleeve 20, the extension of the rib 47 puts the fragment aside and prevents it from entering the air groove 19 even if the broken fragment of the thin film 6 is goindg to enter the air groove 19. Furthermore, even when the fragment enters the air groove 19, the air groove 19 is formed higher so that clogging thereof can be avoided.

(Effect of the invention)

As described above, the electrolyte feeders according to claims 1~6 have the following advantages.

(1) The thin film 6 is formed at the tip end of the filling tube 3 of the container 1 and the electrolyte in each shell body 2 is sealed up by the thin film 6, so that the container can be opened by only breaking the thin film 6 by means of a projecting article, for example, without using scissors or nipper etc. Thus, the filling work can be simplified.

Namely, cutting tools such as scissors or nipper etc. become unnecessary and the spilling of electrolyte and/or scattering of cut-away peices arising when using the scissors or nipper can further be avoided.

(2) The electrolyte 5 of cell units is sealed in each shell body 2 so that a correct amount of electrolyte can be filled in each cell in a short time.

The inventions according to claims 2~6 have the following advantages respectively. In the invention according to claim 2, the following advantages are obtainable.

(1) Since the battery sealing plug 30 is fitted onto the outer periphery of the filling tube 3, it is not necessary to provide a special storage area for keeping the battery sealing plug so that storage of battery before filling electrolyte can be simplified.

(2) Since the battery sealing plug 30 is fitted onto the outer periphery of the filling tube 3 to protect the thin film 6, the thin film 6 can be protected from breakage due to shock etc. generated during transportation of container even if a special protective plug is not provided for the container.

In the inventions according to claims 3 and 4, the following advantages are obtainable.

(1) Since the upwardly extending filling sleeve 20 is formed on the filling hole of each cell, the filling tube 3 can be broken and opened by means of the filling sleeve 20 and at the same time the filling tube 3 can be connected to the filling sleeve 20 by fitting the filling tube 3 of the electrolyte container 1 onto the filling sleeve 20 from upside. Thus, the filling work can be commenced immediately from this state.

(2) Since the air groove 19 (or 29) is formed on the outer peripheral surface of the filling sleeve 20 or on the inner peripheral surface of the filling tube 3 to replace the electrolyte in the electrolyte container 1 with air through means of the air groove 19 (29), it becomes unnecessary to make the air hole at the bottom of the electrolyte container 1. Thereby, the filling work can be more simplified.

In the invention according to claim 5, the following advantage is obtainable.

(1) In the thin film 6, the thermal resisting polyester resin layers 41 for protecting the aluminum sheet body layer are formed on both sides of the aluminum sheet body layer 40 and the polyethylene resin layer 42 for thermocompression bonding is formed on the mostinside surface of the container. Therefore, even if the polyethylene resin layer 42 is perforated when the thin film 6 is bonded by thermocompression to the filling tube 3 of the container, the aluminum sheet body layer 40 is protected by the polyester resin layer 41 from external attacks so that said aluminum sheet body layer 40 has no fear of being perforated due to corrsion by dilute sulfuric acid electrolyte. Namely, the aluminum sheet body layer 40 can be effectively protected from corrsion etc.

In the invention according to claim 6, the following advantages are obtainable.

(1) Since the notched portion 48 for easily breaking the thin film 6 is formed at the tip end 20a of the filling sleeve 20, the thin film 6 can be broken easily by only pushing the container softly. Namely, the breaking strength can be minimized. Further, the broken fragment of the thin film 6 becomes round due to the notched portion 48 provided, so that the fragment becomes hard to enter the air groove 19.

(2) The air groove 19 is formed on the outer peripheral surface of the filling sleeve at a position deviated from said tip end 20a in the circumferential direction, and the rib 47 is formed integrally at the position corresponding to the lower bottom part of the air groove 19. Therefore, the fragment of the thin film 6 does not enter the air groove 19 when giving the filling tube a chance to break the thin film 6 first.

Moreover, when the filling tube 3 is completely fitted onto the filling sleeve 20, the extension of the rib 47 put the fragment aside and prevents it from entering the air groove 19 even if the broken fragment of the thin film 6 is going to enter the air groove 19. Furthermore, even when the fragment enters the air groove 19, the air groove 19 is formed higher so that clogging thereof can be avoided.

What is claimed is:

1. An electrolyte feeder for battery including an electrolyte container, said container comprising: a shell body filled with an electrolyte in a plurality of a spaced cell units equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; an upwardly extending cylindrical filling sleeve being formed on each filling port of said battery; a thin film being formed at a tip end of the filling tube, each shell body being sealed by said thin film, and each shell body being opened by breaking said thin film with the filling sleeve.

2. An electrolyte feeder for battery including an electrolyte container, said container comprising: a shell body filled with an electrolyte in a plurality of spaced cell units, equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; a thin film, which can be opened, being formed at a tip end of the filling tube, and a battery sealing plug is fitted onto an outer periphery of the filling tube.

3. An electrolyte feeder for battery including an electrolyte container, said container comprising: a shell body filled with an electrolyte in a plurality of spaced cell units, equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; a thin film being formed at a tip end of the filling tube, each shell body being sealed by said thin film, a filling hole for each cell being provided on each filling port of a battery cover, an upwardly extending filling sleeve is formed on each filling hole, said filling sleeve fitting in an inner periphery of the filling tube of electrolyte container and said filling sleeve opening the thin film on the filling tube, and air grooves for supplying air to the electrolyte container are formed on an outer peripheral surface of said sleeve.

4. An electrolyte feeder for battery including an electrolyte container, said container comprising: a shell body filled with an electrolyte in a plurality of spaced cell units, equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; a thin film being formed at a tip end of the filling tube, each shell body being sealed by said thin film, a filling hole, for each cell, being provided on each filling port of a battery cover, an upwardly extending filling sleeve being formed on each filling hole, said filling sleeve fitting in an inner periphery of the filling tube of electrolyte container for opening the filling tube, and air grooves for supplying air to the electrolyte container being formed on an inner peripheral surface of said filling tube.

5. An electrolyte feeder for battery including an electrolyte container, said container comprising: a shell body filled with an electrolyte in a plurality of spaced cell units, equal in number to the number of individual cells in a dry charged storage battery, each of said shell bodies having a filling tube, and said filling tubes being spaced to coincide with the spacing between filling ports of said battery to enable the filling tubes to fit into the corresponding one of the filling ports; a thin film being formed on a tip end of the filling tube, said thin film comprising an aluminum sheet body layer, thermal resisting polyester resin layers formed on both sides of said aluminum sheet body layer and a polyethylene resin layer formed of the same material as the container, said polyethylene resin layer being formed on a inner most surface of the container, and each shell body is sealed up by said thin film.

6. An electrolyte feeder for battery as set forth in claim 3, in which a notched portion is formed at a tip end of the sleeve, an air groove is formed at a position deviated from said tip end in a circumferential direction, a radially outwardly extending rib is formed on a sleeve outer peripheral surface corresponding to a lower side part of the air groove.

7. An electrolyte feeder for a battery as set forth in claim 1, wherein said thin film is an aluminum sheet layer and a polyethylene resin layer.

8. An electrolyte feeder for a battery as set forth in claim 1, wherein said thin sheet is bonded by thermocompression to said filling tube of said electrolyte container.

9. An electrolyte feeder for a battery as set forth in claim 2, wherein said thin film is an aluminum sheet layer and a polyethylene resin layer.

10. An electrolyte feeder for a battery as set forth in claim 2, wherein said thin sheet is bonded by thermocompression to said filling tube of said electrolyte container.

11. An electrolyte feeder for a battery as set forth in claim 3, wherein said thin film is an aluminum sheet layer and a polyethylene resin layer.

12. An electrolyte feeder for a battery as set forth in claim 3, wherein said thin sheet is bonded by thermocompression to said filling tube of said electrolyte container.

13. An electrolyte feeder for a battery as set forth in claim 4, wherein said thin film is an aluminum sheet layer and a polyethylene resin layer.

14. An electrolyte feeder for a battery as set forth in claim 4, wherein said thin sheet is bonded by thermocompression to said filling tube of said electrolyte container.

15. An electrolyte feeder for a battery as set forth in claim 5, wherein said thin sheet is bonded by thermocompression to said filling tube of said electrolyte container.

* * * * *